United States Patent
Chen et al.

(10) Patent No.: US 7,126,649 B2
(45) Date of Patent: Oct. 24, 2006

(54) OBLIQUE PLATE COMPENSATORS FOR PROJECTION DISPLAY SYSTEMS

(75) Inventors: Jianmin Chen, Superior, CO (US); Michael G. Robinson, Boulder, CO (US); Gary D. Sharp, Boulder, CO (US)

(73) Assignee: Colorlink, Inc., Boulder, CO (US)

( * ) Notice: Subject to any disclaimer, the term of this patent is extended or adjusted under 35 U.S.C. 154(b) by 0 days.

(21) Appl. No.: 10/696,853

(22) Filed: Oct. 30, 2003

(65) Prior Publication Data
US 2004/0085487 A1 May 6, 2004

Related U.S. Application Data

(60) Provisional application No. 60/422,437, filed on Oct. 30, 2002.

(51) Int. Cl.
*G02F 1/1335* (2006.01)
(52) U.S. Cl. ............. 349/5; 349/9; 349/10; 349/117; 349/119; 349/121
(58) Field of Classification Search ............. 349/5–10, 349/117–121
See application file for complete search history.

(56) References Cited

U.S. PATENT DOCUMENTS 5,105,289 A * 4/1992 Sonehara et al. ........... 349/180
5,798,864 A * 8/1998 Sekiguchi .................. 359/559
5,978,055 A 11/1999 Van De Witte et al.
6,122,028 A * 9/2000 Gilmour et al. ............ 349/117
6,291,035 B1 9/2001 Verrall et al.
6,478,429 B1 * 11/2002 Aritake et al. ................ 353/31

FOREIGN PATENT DOCUMENTS

EP 1160617 A1 12/2001

OTHER PUBLICATIONS

P. Van De Witte, S. Stallings and J.A.M. Van Haaren, "LP-H; Late-News Poster: Novel Compensation Foils for Active-Matrix TN Displays", SID 97 Digest, 1997. pp. 687-690.
Supplementary European Search Report of corresponding European Patent Application No. 03783090.8 issued Nov. 11, 2005.

* cited by examiner

*Primary Examiner*—Andrew Schechter
*Assistant Examiner*—George Y. Wang
(74) *Attorney, Agent, or Firm*—Baker & McKenzie-LLP

(57) ABSTRACT

Projection systems having o-plate compensation elements are described. The compensation elements may be negative, positive or biaxial anisotropic element and may have a homogeneous tilt or a splayed tilt. The compensation elements may be formed from a polymer liquid crystal. The compensation elements are designed to maximize azimuth-averaged contrast. The compensation elements may be placed on the same side of a liquid crystal panel when a micro-lens array is used to improve the ease of manufacture.

51 Claims, 9 Drawing Sheets

(I)   (II)

(III)   (IV)

(45°, 0-50°)

(135°, 50-0°)

US 7,126,649 B2

OBLIQUE PLATE COMPENSATORS FOR PROJECTION DISPLAY SYSTEMS

PRIORITY CLAIM AND RELATED APPLICATION

The present application claims priority from U.S. Provisional Application entitled "Compensators and Methods," Ser. No. 60/422,437 filed Oct. 30, 2002, having Jianmin Chen, Michael G. Robinson, and Gary D. Sharp as inventors, and having as assignee ColorLink, Inc., the assignee of the present application. This provisional application is incorporated herein by reference in its entirety for all purposes.

FIELD OF THE INVENTION

The present invention relates generally to compensators, and more particularly, to oblique-plate compensators for liquid crystal projection display systems.

BACKGROUND

Projection systems have contrast needs that are continually increasing while the projection system marketplace desires more cost effective components and system configurations. These projection systems liquid crystal panels for modulating red, green, and blue light (i.e., the primary colors) or other light spectra, wherein the liquid crystal panels are compensated with one or two retarder films per panel. The less expensive and lower contrast projections systems use a single retarder film per panel to provide compensation, while the more expensive and higher contrast projection systems use a retarder film on each side of the panel for compensation. Existing compensation techniques, however, do not meet the increasing contrast needs and cost limitations imposed by the marketplace for projection systems.

SUMMARY OF THE INVENTION

The present application describes compensators and method of making compensators for a compensation scheme for liquid crystal display projection systems. According to an embodiment, the compensation scheme improves azimuth-averaged contrast and is substantially unconstrained by specific azimuth-dependent contrast requirements that are common in non-projection systems. Disclosed compensation schemes preserve the state of polarization for normally incident light while adjusting the state of polarization for off-normal incident rays. In specific embodiments, positive-anisotropic multilayer liquid crystal polymer layers are used to correct the state of polarization of off-normal incident rays.

Also provided in the disclosed embodiments is a compensation scheme with splayed compensators located on one side of display panels to simplify the projection system manufacturing process and to reduce production costs. This embodiment maintains the average contrast and improves the azimuth-averaged contrast. The splayed compensators may be placed on the low f-number side of the panel (image side) for improved performance in systems having microlens arrays. In another embodiment, the compensators can be located on opposite sides of display panels.

Additional embodiments disclose compensators with splayed positive-anisotropic multilayer structures. The multilayer structures can be fabricated on a single substrate, or faces of one or more layers can be bonded face-to-face on separate substrates using various adhesives. The multilayer structures fabricated on separate substrates do not require direct application of antireflection coatings onto the liquid crystal polymer layers and improve overall yield by pairing satisfactorily fabricated components.

Disclosed embodiments also provide a compensation scheme using a compensator having an optical axis with a z-component. Compensation plates with this property include oblique-plate ("o-plate") compensators. These o-plate compensators may be homogeneous or splayed, and may have positive, negative, or biaxial anisotropy. The splayed o-plates may be obtained by having a different pre-tilt angle at each interface. Alternatively, the o-plates may have an inhomogeneity, such as twist. For example, the compensator may be a twisted liquid crystal o-plate compensator.

DETAILED DESCRIPTION

The desired sequential contrast of projection systems has and continues to increase, owing in part to the high performance of digital light processing based projection systems. Liquid crystal panels, such as high temperature polycrystalline silicon (HTPS) twisted nematic liquid crystal displays, are transmissive in nature and have a small diagonal size (<1.2" or <3.1 cm). These panels use a twisted nematic liquid crystal alignment, operating in a normally white mode, with the polarized light introduced parallel to the rub direction, it is e-mode. However the compensation scheme works for both e and o mode. For e-mode, the rub direction of LC is parallel to the direction of polarizer while in o-mode, the rub direction of LC is perpendicular to the direction of polarizer. The projection systems operate at typical f-numbers of 2.5 at the input side so as to efficiently utilize lamp emission. When the projection systems include micro-lens arrays, image light is transmitted at much lower f-numbers. The contrast of such systems, with or without micro-lens arrays, may be quite high at normal incidence. However, off-normal rays see a director distribution that depends on incidence angle and azimuth angle. This distribution, along with small geometrical distortion, determines the degree to which light is transmitted by an analyzing polarizer. When averaged over the usable angular spectrum of the lamp, the contrast may be significantly compromised. Thus, it is advantageous to introduce compensation plates that provide zero correction of normally incident light while correcting the state of polarization for rays introduced off-normal.

In direct-view flat-screen display applications, compensator optimization is very azimuth specific. For example, the side-to-side viewing angle in such applications must be large and symmetric, whereas the up-down viewing angle can be substantially smaller and/or less symmetric. However, projection systems are more dependent upon improving azimuth-averaged contrast. Thus, a new degree of freedom may be exploited to increase the average contrast in projection systems, decrease the manufacturing cost, or both, because the difference between direct-view flat-screen displays applications and projection application has been recognized.

Figure 1:
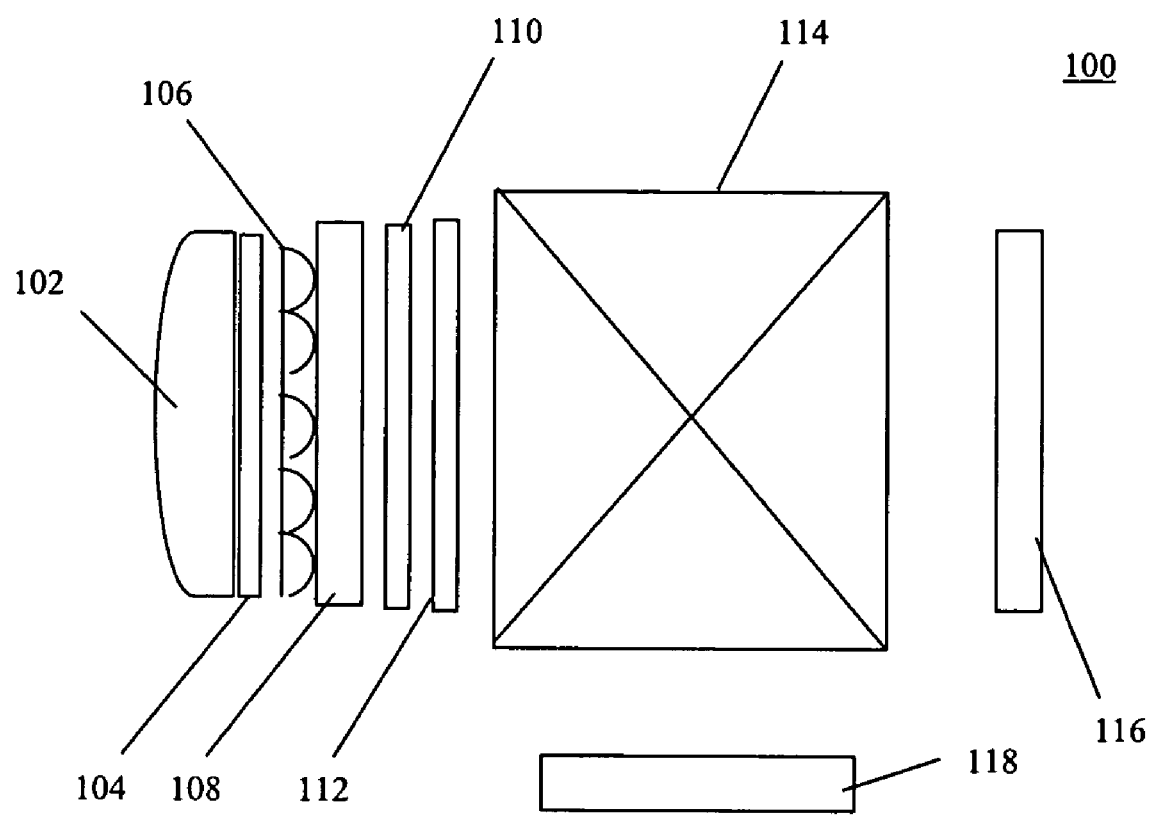
FIG. 1 illustrates an exemplary high temperature polycrystalline silicon projection system.

FIG. 1 illustrates an exemplary high temperature polycrystalline silicon projection system 100. The system 100 includes three image-producing portions that produce red, blue and green or primary color images or that produce images corresponding to other light spectra. The first image-producing portion includes a light source 102, a linear polarizer 104, a micro-lens array 106, a liquid crystal panel 108, a compensator 110, and an analyzer 112 that produces a color image that is input into an X-cube 114. The second image-producing portion 116 and the third image-producing portion 118, which are not shown in detail, have a structure similar to that of the first image producing portion and produce images of different colors for input into the X-cube 114. The three colors of light produced by the image producing portions are combined by the X-cube 114 and output to a projection lens that is located at the port of the X-cube 114 without an image-producing portion (not shown).

The compensator 110 is on the low f-number side of the micro-lens array 106 and may be located at the light input or light output side of the panel 108. In an exemplary embodiment, the projection system 100 includes sheet polarizers as the polarizers 104 and 112, a panel 108, and a compensator 110 which, for example, can be a single compensation plate or a pair of compensation plates. The micro-lens array 106 can be a part of the panel 108. When the micro-lens array 106 is part of the panel 108, it is difficult to include one or more compensation plates between the micro-lens array 106 and the panel 108 using conventional compensation plates. However, liquid crystal polymer layers may be readily incorporated due to their thinness, environmental robustness, and their manufacturing compatibility. Alternatively, a pair of compensators 110 may be used. The pair of compensators 110 may be located at the light input and light output sides of the panel 108 or on a single side of the panel 108. Another alternative is to have the compensator 110 be one of the substrates that form the panel 108. As such, the compensator may reside between the micro-lens array 106 and the liquid crystal of the panel 108. Such an embodiment may be made from a suitable liquid crystal polymer material.

By way of example, azimuth-averaged contrast of a system with a 90° twisted nematic (TN) cell with first minimum condition at 550 nm may be calculated from the azimuth average ratio of on-to-off state of phototropically weighted transmission of green light for a given f-number. Similar calculations may be done for red and blue lights. This system includes a liquid crystal material such as ZLI4792, which is a nematic liquid crystal available from Merck & Co., Inc. and which has the parameters listed in Table 1. The black state voltage for this material is 6V, and the white state voltage is 0V. The light source may be an ultra high-pressure (UHP) lamp that has a cone angle of about 10 degrees.

TABLE 1

Figure 2:
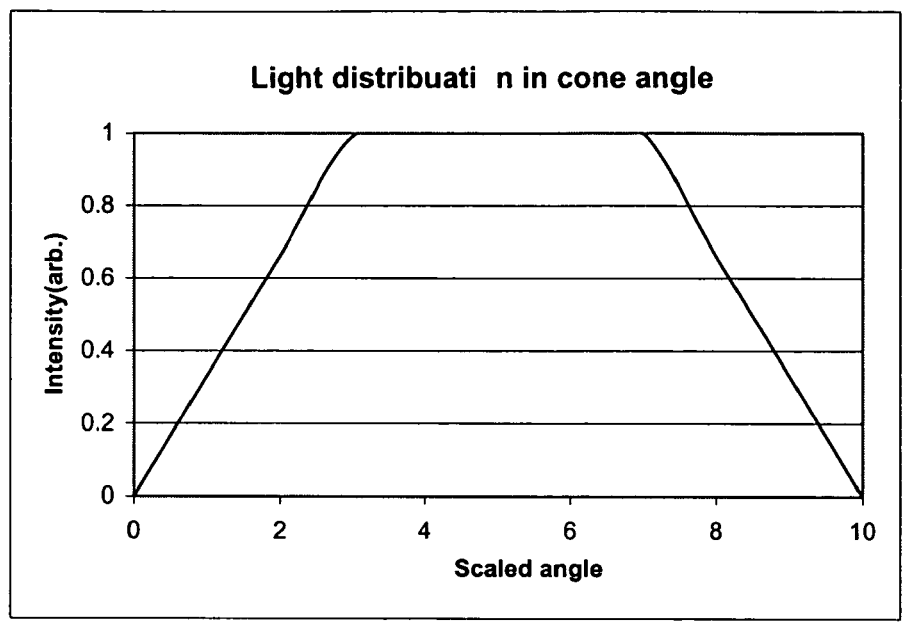
FIG. 2 is an exemplary light intensity distribution.

Front ideal polarizer (45°) with no retardation substrate
Buffing direction at top (45°)
Thickness d = 5.2 um
Pretilt angle top and bottom (5°)
Twist angle 90°
Buffing direction at bottom (315°)
Rear ideal polarizer (135°) with no retardation substrate
K11 = 10.2, K22 = 5.6, K33 = 15.6, d/p = 0.033
$n_o = 1.478 + 0.00056/\lambda^2$
$n_e = 1.568 + 0.00096/\lambda^2$
$\epsilon_{(para)} = 10.5$, $\epsilon_{(perp)} = 4.8$
$V_{off} = 6$ V and $V_{on} = 0$ V
Cone angle is 10 degree FIG. 2 illustrates an exemplary light intensity distribution. The light intensity may have the azimuthally symmetric distribution illustrated in FIG. 2 or other suitable distributions. The contrast is calculated by averaging the contribution from the light cone with the weighted intensity profile.

Some prior art compensation schemes depend upon azimuthal symmetry of the director distribution of the panel 108 in the black-state. The dependence upon the azimuthal symmetry occurs because the optic axis has a vertical component, which may be observed in prior art projection systems that use a negative c-plate for compensation. Compensation with such a pair of negative c-plates directly to each side of a panel improves the contrast in the horizontal plane at the expense of the contrast in the ±45° plane. As a result, there is no significant overall improvement in a projection system using the negative c-plates because the leakage is averaged over the cone angle.

Figure 3:
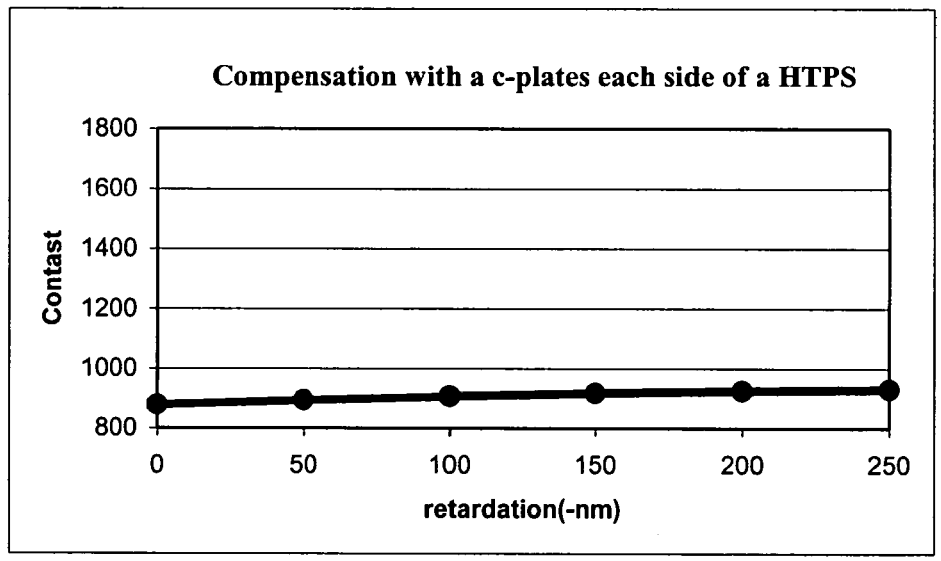
FIG. 3 shows contrast versus retardation distribution of a prior art projection system having a pair of negative c-plates.

FIG. 3 illustrates the contrast versus retardation of a prior art projection system having a pair of negative c-plates. This indicates that the off-normal contrast of the panel is affected by the residual splayed side regions of the liquid crystal and not the near vertically aligned center. Thus, a compensator scheme having a compensator with an odd symmetry component may be used to achieve significant contrast improvement in a projector system.

Compensation plates with tilted axes are called o-plate compensators. Compensation plates with this property include o-plate compensators. These o-plate compensators may be homogeneous or splayed, and may have positive, negative, or biaxial anisotropy. The splayed o-plates may be obtained by having a different pre-tilt angle at each interface. Alternatively, the o-plate may have an inhomogeneity, such as twist. For example, the compensator may be a twisted liquid crystal o-plate compensator.

Figure 4:
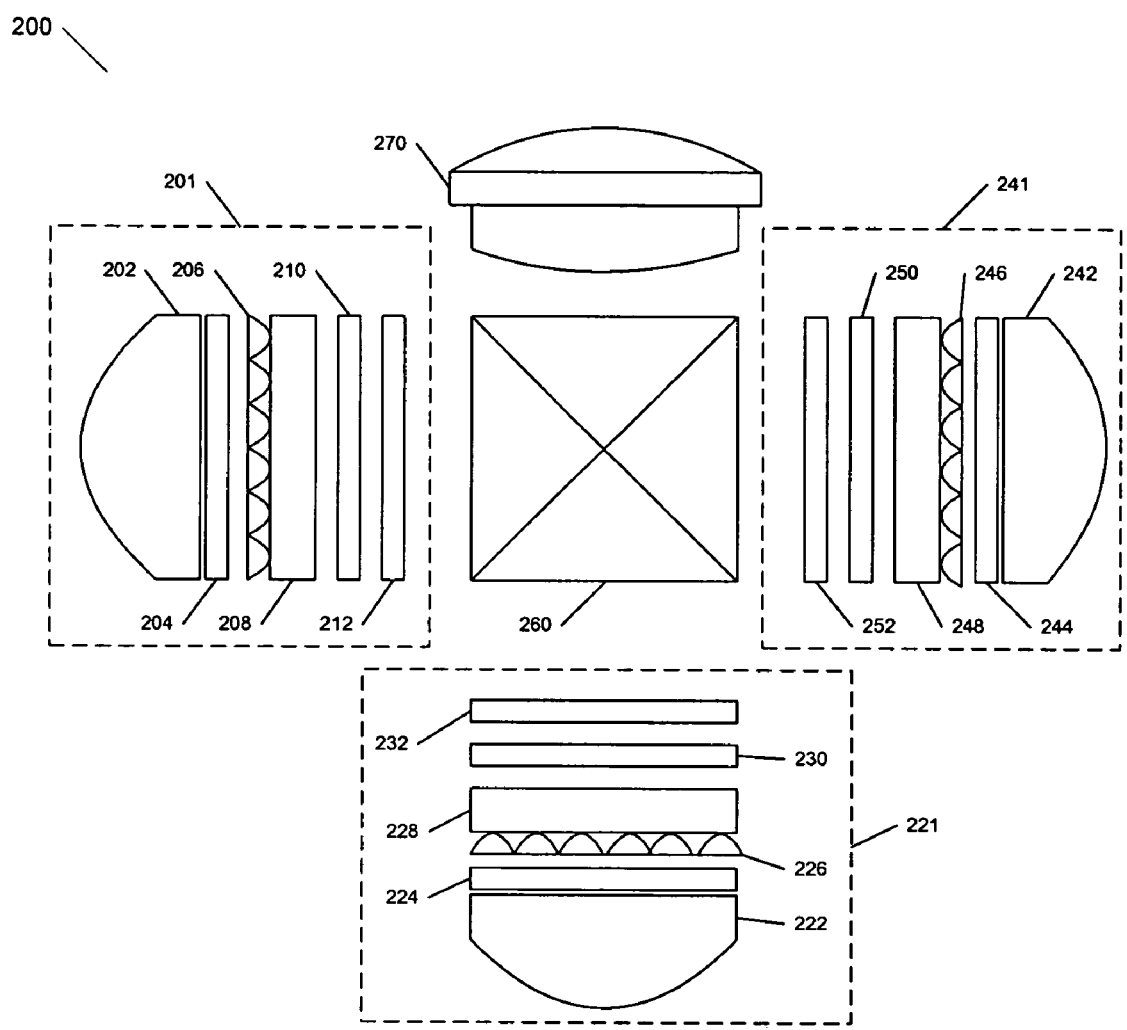
FIG. 4 illustrates an exemplary high-temperature polycrystalline silicon twisted nematic liquid crystal projection display system with o-plate compensators.

FIG. 4 illustrates an exemplary high-temperature polycrystalline silicon twisted nematic liquid crystal projection display system 200 with o-plate compensators. The system 200 includes three image-producing portions 201, 221, and 241. The image-producing portions 201, 221, and 241 are configured to produce red, blue and green images. The image-producing portion 201 includes a light source 202 and a linear polarizer 204. The light source 202 may be an ultra high-pressure (UHP) lamp that has a cone angle of about 10 degrees. The image-producing portion 201 further includes a micro-lens array 206 adjacent to a liquid crystal panel 208. The micro-lens array 206 can be a part of the liquid crystal panel 208.

An o-plate compensator 210 compensates the liquid crystal panel 208 and an output analyzer 212 analyzes the light output from the liquid crystal panel 208. In the present example, the o-plate compensator 210 is on the low f-number side of the micro-lens array 206 and may be located at the light input or light output side of the liquid crystal panel 208. In an exemplary embodiment, the image-producing portion 201 includes sheet polarizers as the polarizers 204 and 212. In some embodiments, the compensator 210 can be a single compensation plate or a pair of compensation plates. If a pair of compensation plates is used to compensate the liquid crystal panel 208, then the compensation plates can be located at the light input and light output sides of the liquid crystal panel 208 or on a single side of the liquid crystal panel 208. Another alternative is to have the compensator 210 be one of the substrates that form the panel 208. As such, the compensator may reside between the micro-lens array 206 and the liquid crystal of the panel 208. Such an embodiment may be made from a suitable liquid crystal polymer material.

The image-producing portions 221 and 241 have structures similar to the image-producing portion 201. The image-producing portion 221 includes a light source 222, a linear polarizer 224, a micro-lens array 226, a liquid crystal panel 228, an o-plate compensator 230, and an analyzer 232. Similarly, the image-producing portion 241 includes a light source 242, a linear polarizer 244, a micro-lens array 246, a liquid crystal panel 248, an o-plate compensator 250, and an analyzer 252. The images produced by the image-producing portions 201, 221, and 241 are processed by a light-directing element 260. In the present example, the light-directing element 260 is an X-cube. The light-directing element 260 combines the three colors of light produced by the image-producing portions and outputs it to a projection lens 270 located at the output port of the light-directing element 260.

In some embodiments, the compensators 210, 230, and 250 can be positive or negative anisotropic compensators that can be made from a suitable material or materials such as nematic liquid crystals, discotic liquid crystals, or other suitable liquid crystal materials and having a splayed alignment. Typically, the compensation layer directly adjacent to one side of a liquid crystal panel compensates the liquid crystal on the same side. The plane of the splay is typically co-planar with the compensator splay. The splay of the liquid crystal and the near adjacent compensator plate being co-planar is advantageous when a projection system may be readily manufactured that includes compensator on each side of the panel because the liquid crystal that is adjacent to a compensator will be well-matched to the compensator for compensation purposes. This is because both the liquid crystal and the compensator have a splayed structure. However, in some embodiments, such as positive compensators, using a compensator to compensate the splay on the opposite side of the panel may be advantageous because the retardance of the near splay acts as a polarization element.

Figure 6:
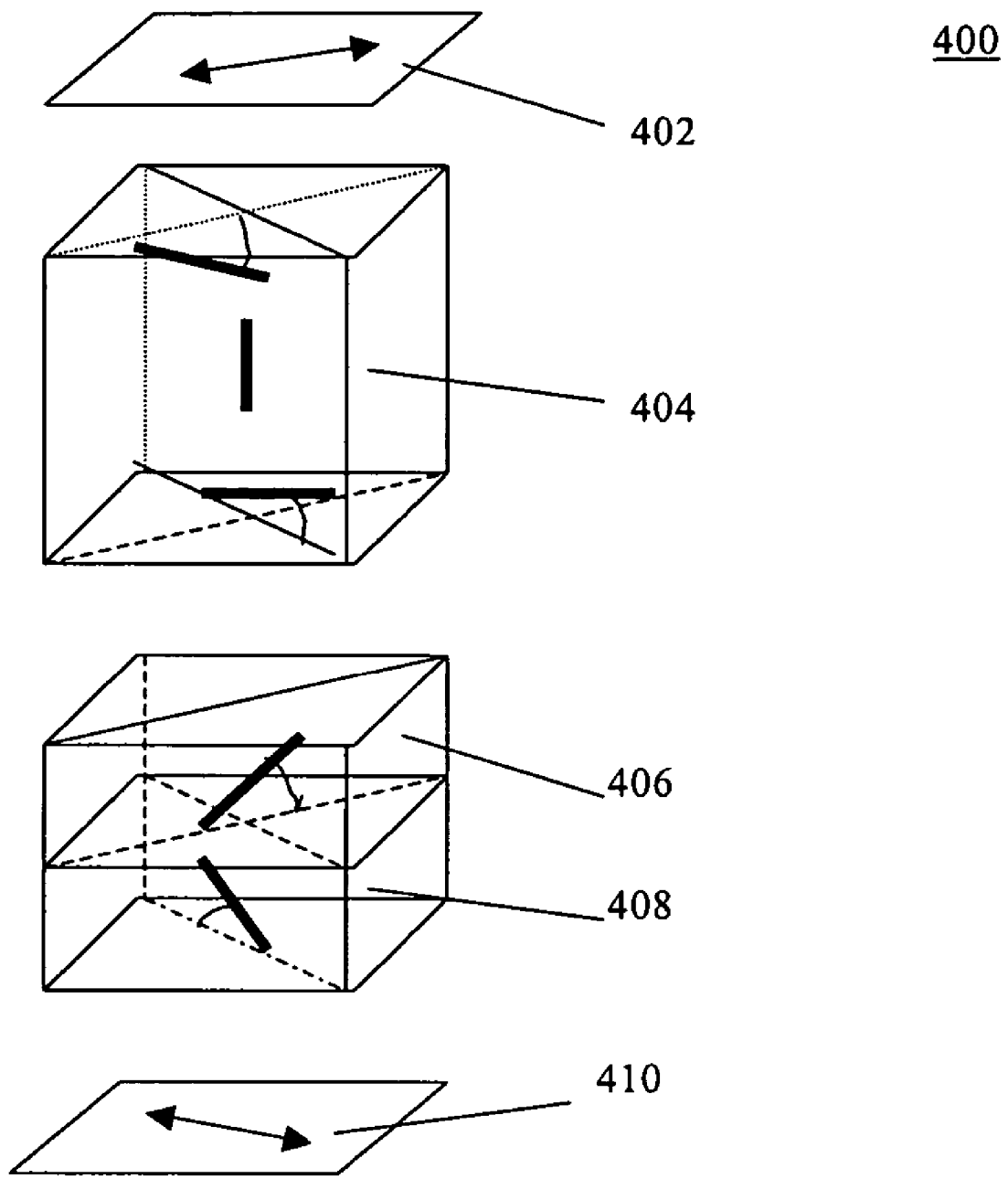
FIG. 6 is another exemplary configuration for compensation of a projector system including a pair of positive o-plates.

A specific compensation scheme for a driven twisted liquid crystal mode using positive uniaxial plates is shown in FIG. 6. The compensation scheme of FIG. 6 can be used to describe the general methodology of this approach. First, the driven twist liquid crystal mode can be represented conceptually as a three-layered positive birefringent structure consisting of an upper tilted layer, a central normally aligned layer, and a third lower tilted layer. A positive, two-layer compensator is shown directly beneath the liquid crystal 404 in FIG. 6. In the present example, the layers of the compensator are positive uniaxial and have uniform tilted optic axes. The positive birefringent compensator layers act to compensate the liquid crystal tilted layers through a three-transformation scheme. The upper and lower compensator layers are effectively compensated by the upper and lower tilted liquid crystal layers respectively. The compensation of any one tilted liquid crystal layer is achieved by correcting the depolarization effects of both the tilted layer and the subsequent birefringent layers. This scheme separates conveniently into the compensation of upper and lower liquid crystal tilted layers for light propagating in two specific planes. These planes are normal to the liquid crystal cell substrate and contain the optic axes of the tilted liquid crystal layers. In the exemplary embodiment shown in FIG. 6, these planes are orthogonal.

Table 2 illustrates the projected optic axes of each of the layers for an optical ray propagating at an angle off-normal in this a plane when the light propagating in the plane contains the optic axis of the lower tilted liquid crystal layer.

TABLE 2

| Layer | Projected optic axis |
| --- | --- |
| upper tilted liquid crystal layer | rotated with respect to the external polarization axes |
| central liquid crystal layer | parallel to the top polarizer axis |
| lower tilted liquid crystal layer | parallel to the top polarizer axis |
| upper compensator layer | rotated with respect to the external polarization axes |
| lower compensator layer | parallel to the top polarizer axis |

Because the optic axis of the lower compensator layer remains parallel to the lower polarizer axis, it cannot affect the transmitted intensity so it can be ignored. Since the central and lower liquid crystal layers have the same optical axes, they can be considered as a single positive retarder.

The upper compensator layer therefore acts to correct through a third polarization transformation, the depolarization of the first tilted retarder, followed by the second retarder whose optic axis is defined by the propagation direction. The angle of the optic axis of the upper layer and the retardance value of the central layer are both near proportional to the angle of propagation in this plane. The angle dependence of the desired compensation demands a tilted compensator. Its tilt angle has to be opposite in angle to that of the compensated upper liquid crystal tilted layer to undo the net induced polarization. The exact values for tilt angle and retardance are dependent on the driven liquid crystal parameters, but the sign of the orientation angle is fixed by the net three-transformation scheme.

Table 3 illustrates the projected optic axes of each of the layers for an optical ray propagating at an angle off-normal in a plane when the light propagating in the plane contains the optic axis of the upper tilted liquid crystal layer.

TABLE 3

| Layer | Projected optic axis |
| --- | --- |
| upper tilted liquid crystal layer | parallel to the top polarizer axis |
| central liquid crystal layer | parallel to the top polarizer axis |
| lower tilted liquid crystal layer | rotated with respect to the external polarization axes |
| upper compensator layer | parallel to the top polarizer axis |
| lower compensator layer | rotated with respect to the external polarization axes |

Because the optic axis of the upper and central compensator layers remain parallel to the upper polarizer axis, they cannot affect transmitted intensity so it can be ignored.

The lower compensator layer therefore acts to correct the depolarization of a tilted retarder associated with the upper liquid crystal layer and a retarder associated with the upper compensator layer whose optic axis is defined by the propagation direction. Again, the angle of the optic axis of the upper layer is dependent on the angle of propagation requiring a tilted compensator whose tilt angle has to be opposite to that of the compensated lower liquid crystal tilted layer. By optimizing for each propagation plane, an effective oblique positive birefingent plate compensation scheme can be realized for twisted nematic modes. The compensation scheme also works for polarizer axes that are rotated by 90 degrees. Further improvement to this approach could use negative or positive c-plates (i.e., birefringent layers whose optic axes are normal to the liquid crystal substrate) to add or subtract to the retardation projected onto the polarizer axes in the above two scenarios.

Figure 5A:
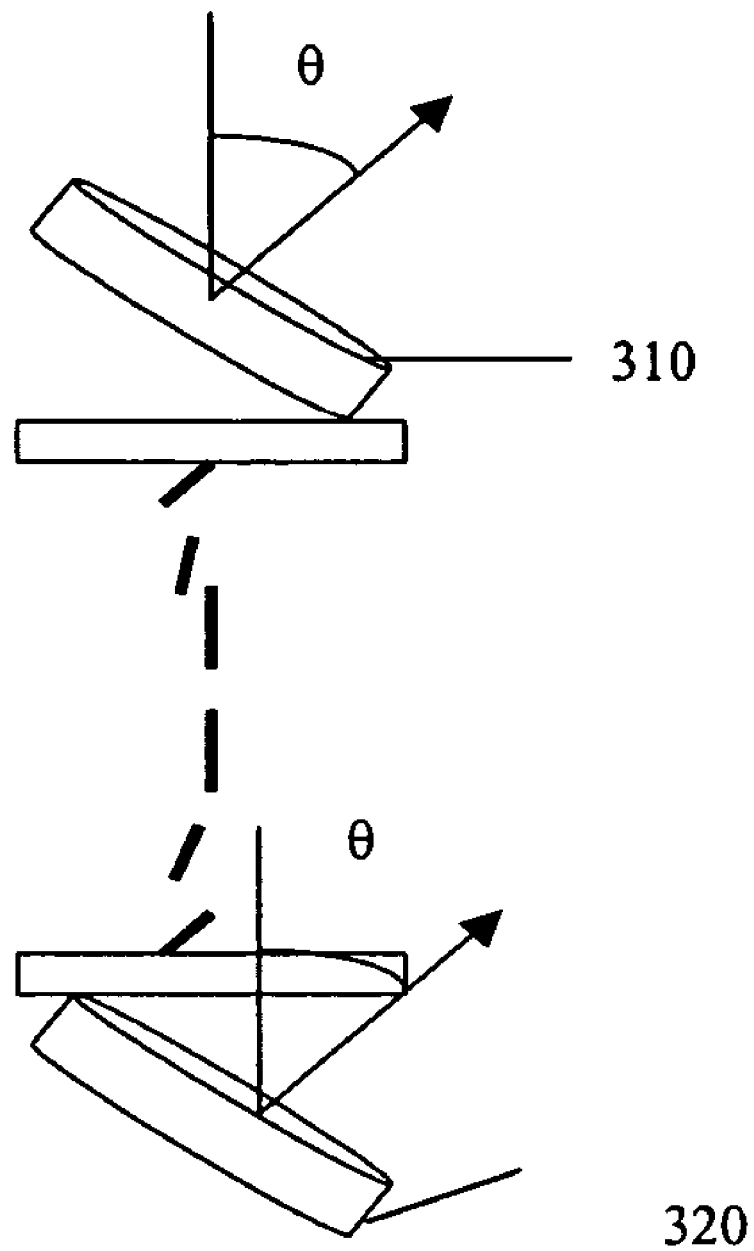
FIG. 5A is an exemplary configuration having two negative o-plates for compensation of a high-temperature polycrystalline silicon twisted nematic liquid crystal display.

FIG. 5A illustrates an exemplary configuration having two negative o-plates 310 and 320 for compensation of a high-temperature polycrystalline silicon twisted nematic liquid crystal projection display system, such as system 400 of FIG. 4. The negative o-plates 310 and 320 have a tilt of θ and the tilt axes in the two negative o-plates are orthogonal to each other. The liquid crystal has a 90° twisted nematic structure and the liquid crystal adjacent to the substrate-liquid crystal boundary has its average optical axis substantially parallel to the average optical axis of the adjacent o-plate.

Figure 5B:
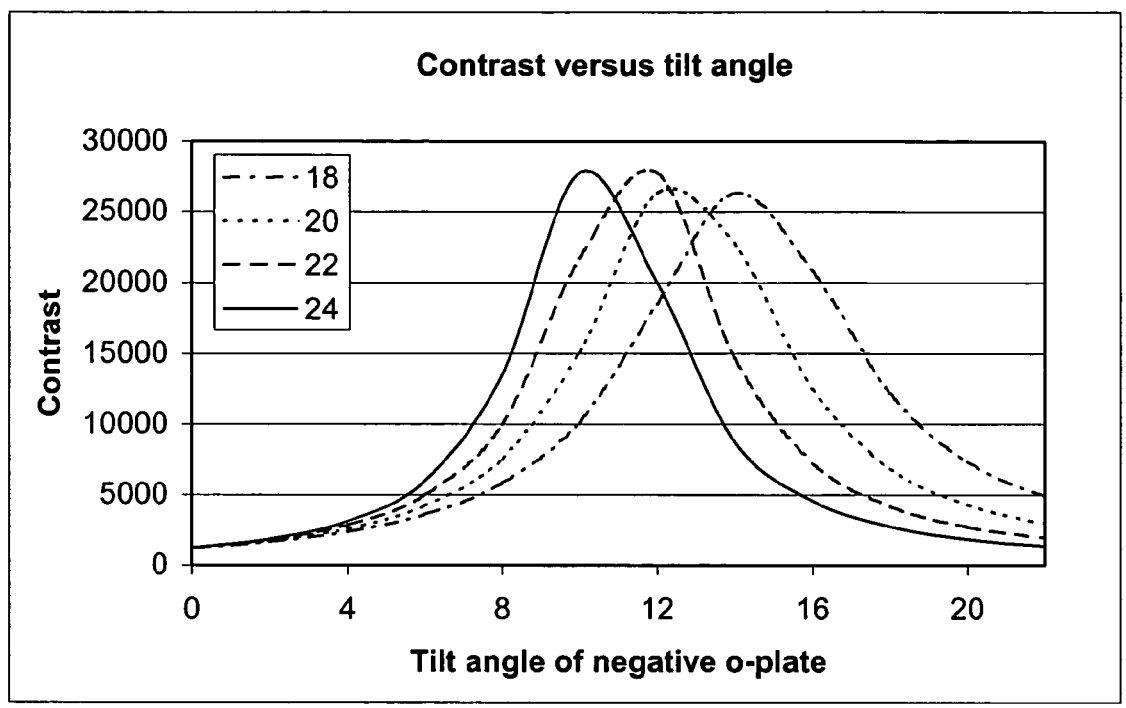
FIG. 5B illustrates the contrast versus tilt angle for a projection system with two negative o-plates.

FIG. 5B illustrates the contrast versus tilt angle for a projection system with two negative o-plates. The thickness values of the o-plates are 18, 20, 22 and 24 microns. FIG. 5 demonstrates that very high contrast can be achieved for various thicknesses and tilt angles.

FIG. 6 illustrates an exemplary compensation scheme for a projector system including a pair of positive o-plates. The system 400 includes a twisted nematic liquid crystal panel 404 adjacent to a polarizer 402 that is oriented at 45°. A first positive o-plate 406 having an orientation of θ, 45°, a second positive o-plate 408 having an orientation of θ, 135°, and a polarizer 410 orientated at 135°. The twisted nematic liquid crystal panel 404 having a left handed twist. Alternatively, the tilt in the two positive o-plates can be different.

An example of this exemplary embodiment having different tilts for the two o-plates includes a twisted nematic liquid crystal panel made from any commercially twisted nematic cell having a left handed twist, a first positive o-plate 406 having an orientation of 30°, a Δn=0.008 and a d=11.5 μm, a second positive o-plate 408 having an orientation of 24°, a Δn=0.008 and a d=14 μm. The polarizer 402 is oriented at 45° and the polarizer 410 is orientated at 135°. This system results in a contrast of over 11,000:1 in the absence of depolarizing effects not attributed to the liquid crystal and compensator birefringent profiles.

An example of this exemplary embodiment having different tilts for two splay o-plates includes a twisted nematic liquid crystal panel made from any commercially twisted nematic cell having a left handed twist, a first positive-splay o-plate 406 having an orientation of 0°, 45°, and an on-axis retardation Γ(on-axis)=55 nm, a second positive o-plate 408 having an orientation of 0°, −32°, and an on-axis retardation Γ(on-axis)=72 nm. The polarizer 402 is oriented at 45° and the polarizer 410 orientated at 135°. This system results in a contrast of over 60,000:1 in the absence of depolarizing effects not attributed to the liquid crystal and compensator birefringent profiles, because the varying structure of a splay cell is closer to the structure of the twisted nematic liquid crystal than that of a homogeneous fixed tilt compensator. Moreover, because the splay structure improves the contrast sufficiently, this compensation scheme can also be applied to devices other than projection systems such as, for example, flat panel liquid crystal displays.

According to another exemplary embodiment of the invention, a first compensator is used to compensate the first liquid crystal splay and the side and a second compensator to compensate the second liquid crystal splay thus, breaking the symmetry of a two-sided compensation scheme. Using the single layer model for splay, consider an input ray in the plane perpendicular to the input splay of the twisted nematic liquid crystal display. The twisted nematic splay appears as a counter-clockwise rotated retarder. This is followed by a retarder along the eigen-direction formed of the z-retardance of the cell in combination with the output splay of the twisted nematic liquid crystal display. The polarization correction is applied by the first compensator, which represents a clockwise-rotated retarder. The second compensator contributes a retardation along the eigen-direction, which has no effect on the state-of-polarization. For this plane, the compensation is as much as the above.

The situation is now changed for a ray incident in the plane of the twisted nematic input splay. Here, the eigen-oriented retarder made up of the twisted splay and the z-retardance of the cell is first encountered, which has no effect on the state-of-polarization. This is followed by the splay-up of the second surface of the liquid crystal display, which represents a counter-clockwise rotated retarder. The first compensator now represents a retarder along the eigen direction. This is followed by the splay-down of the second compensator, which represents the clockwise-rotated retarder. In this plane, both compensators participate in the three polarization transformations.

Optimization of the overall contrast of the compensator according to the present invention involves independent selection of the splay parameters (pretilt at each surface) and retardation of the compensators in view of the specific liquid crystal display parameters. In the plane orthogonal to the input twisted nematic splay, only the parameters for the first compensator (the compensator adjacent to the liquid crystal) are relevant. This plane may therefore be used to establish the criteria for the first compensator. Adjustment to the second compensator may then be used near the center for maximum contrast contour and broadened angular high-contrast coverage along the normal incidence direction. This method is an efficient way of selecting the compensator parameters to produce a high contrast. Thus, one or more additional layers can be inserted to further optimize the performance. For example, a particular amount of z-retardation can be inserted between the first compensator and the second compensator.

Figure 7:
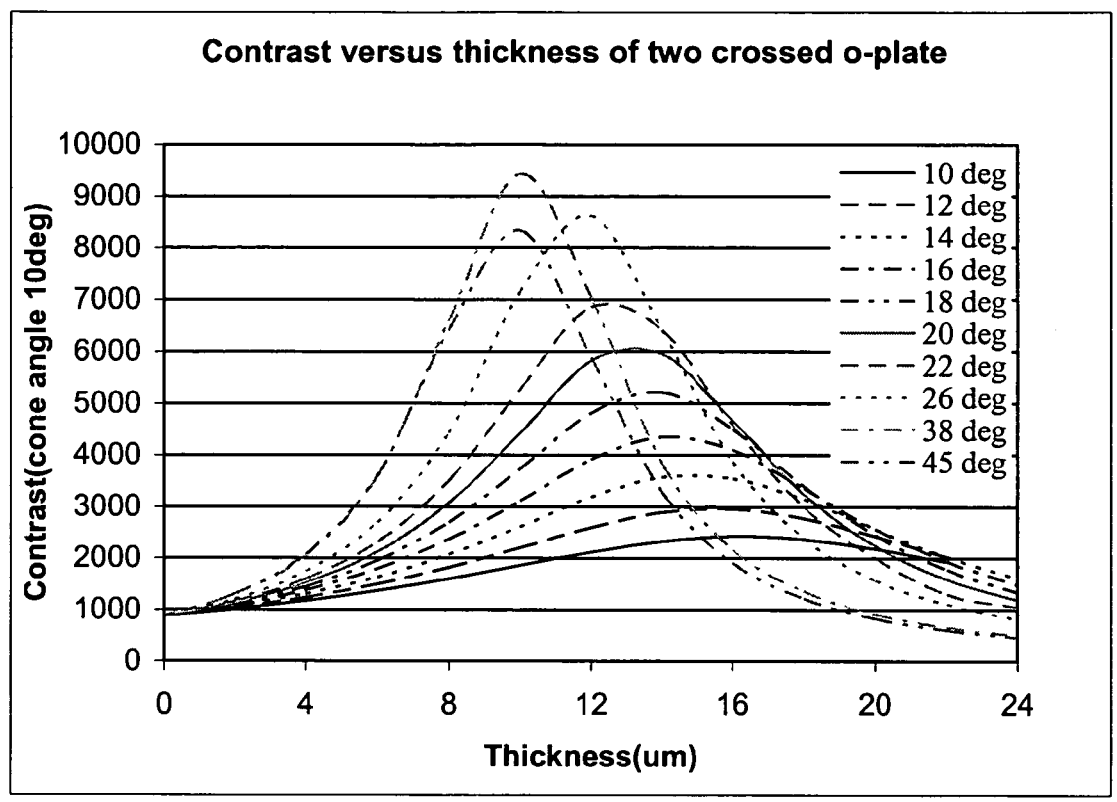
FIG. 7 shows the effect of thickness on the contrast for two positive o-plate compensation scheme.

FIG. 7 shows the contrast versus thickness for compensation using two positive o-plates. In described embodiments, the thickness of the o-plates is about 8 um to about 15 um, with optimal designs usually having thicknesses of 10 um to 12 um. The tilt angle of the o-plates may have a range from 10° to 50°, with optimal designs usually having a tilt angle in the 20° to 40° range and birefringence Δn=0.008.

Figure 8:
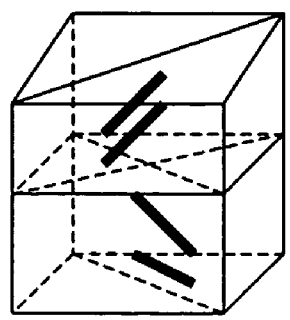
FIG. 8 illustrates four possible configurations that include one uniform tilt compensation plate and one splayed compensation plate.
Figure 8:
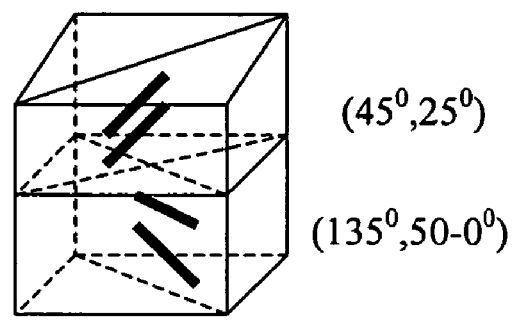
Figure 8:
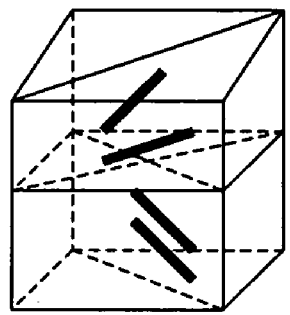
Figure 8:
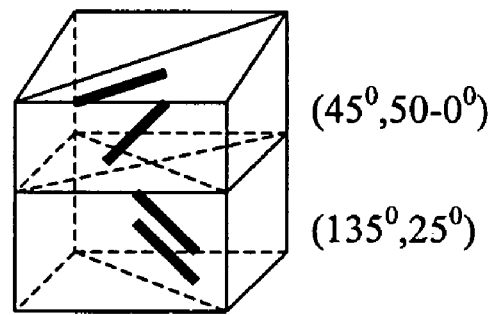

FIG. 8 illustrates four possible configurations that include one uniform tilt compensation plate and one splayed compensation plate. The contrast is 5600:1 in configuration I, 8200:1 in configuration II, 8800:1 in configuration III, and 6500:1 in configuration IV. The top plate is orientated at 45° and the bottom plate at 135°. The tilted plate has tilt of 25° and the splayed plate has a tilt ranging from 0–50° or from 50–0°. The thickness of the plates is 12 um with delta(n)

=0.008. The orientations of the plates may be other than 45° and 135°. For example, the orientations of the plates may be any two orientations that are orthogonal. The tilt of the splay plates may be either 0° or 50° and may have a difference other than 50°.

Figure 9:
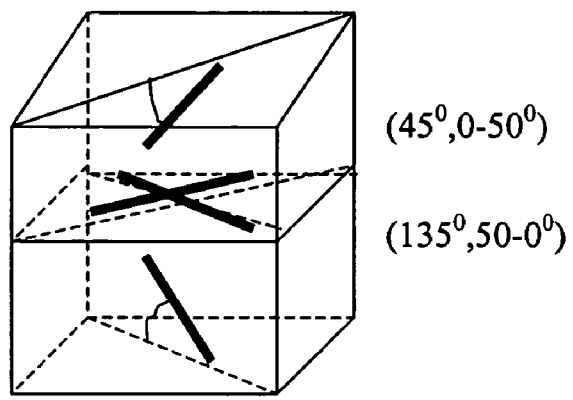
FIG. 9 is an exemplary configuration of a dual splayed compensation scheme having a first compensation plate with (45°, 0–50°) and a second compensation plate with (135°, 50–0°)

FIG. 9 illustrates a dual splayed compensation scheme having a first compensation plate with (45°, 0–50°) and a second compensation plate with (135°, 50–0°) that has a contrast of over 9000:1. The orientations of the plates may be other than 45° and 135°. For example, the orientations of the plates may be any two orientations that are orthogonal. The tilt of the splay plates may be either 0° or 50° and may have an angular difference other than 50°. Additionally, the two splay plates may have similar or identical splays, or may have asymmetric or different splays.

Figure 10:
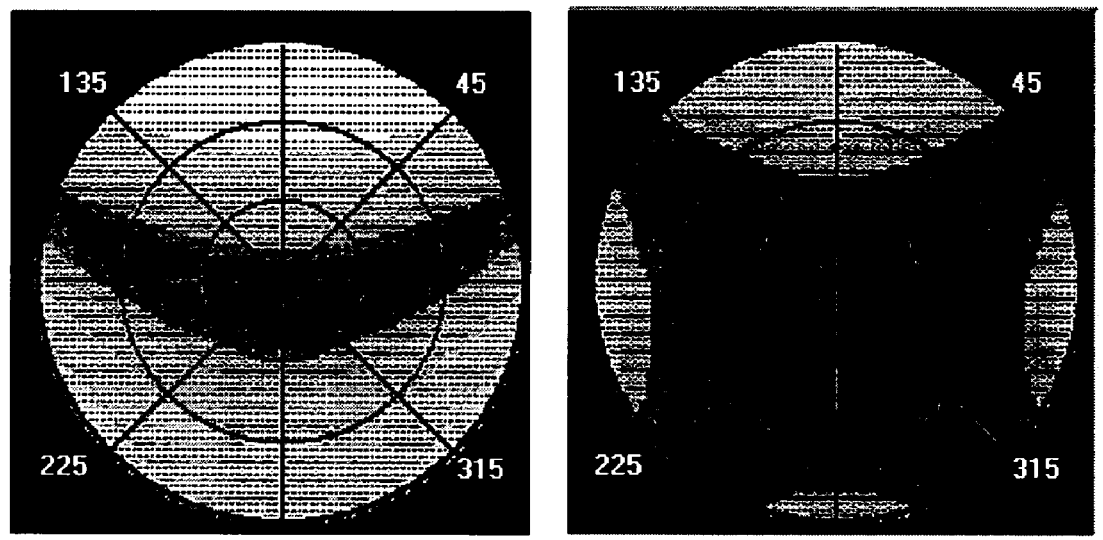
FIG. 10 shows the field of view of high temperature polycrystalline silicon displays with and without two splayed o-plate compensation.

FIG. 10 illustrates the field of view of a HTPS with and without two splayed o-plate compensation.

Technologies for producing retarder films include stretched polymer films, polishing inorganic crystals, oblique deposited or patterned films, liquid crystals, and polymer liquid crystals. Some methods may be better suited to some applications than other methods. For example, stretched retarders are well suited for retardances larger than 100 nm, with best-case standard deviation of ±2 nm. However, stretched retarders can be difficult to control at very low retardation values and it may be difficult to satisfy the cosmetic requirements due to the casting process. In practice, it may be difficult to mount stretched retarder films in a way that is mechanically reliable, performs well optically under thermal loading, and produces low overall transmitted wavefront distortion. Additionally, stretching methods may not produce oblique optic axis orientations, which can result in low yield and increased cost.

Another example is inorganic retarders. Inorganic retarders may be made with oblique optic axis orientation by appropriate sawing of the raw material followed by a polishing. The polishing of materials, such as quartz, to zero-order half-wave retardances has been demonstrated. Inorganic retarders are advantageous because of their high optical quality and high light intensity handling capability.

Liquid crystal polymer films have the potential to satisfy all of the above criteria. With control of pretilt at each interface, both splayed and homogeneous films can be made. With multilayers, there is no limitation to the types of compensation structures that are possible. For example, nematic polymer liquid crystals having positive dielectric anisotropy, are widely available and may be aligned using similar physics to non-polymer liquid crystal that are in a fluidic state. Another example is a compensation structure placed between a micro-array and the liquid crystal panel. The polymer compensation structure must be thin, robust (e.g., may be used with high intensity lamps), and compatible with existing manufacturing techniques. These polymer liquid crystals are cross-linked to form a solid film using ultra-violet (UV) light or another suitable technique. These techniques may be used to create small and large pretilt angles at either or both the substrate and air interfaces. Conventional coating methods may be used to deposit such thin compensation films onto a single substrate or conventional glass-to-glass cell fabrication that is followed by UV cross-linking may be used to fabricate the compensation plates.

The manufacture of compensation films with well-controlled director distributions and precise retardation, facilitate reproducible compensation schemes and provide reliable performance. For example, low retardance films that are not readily manufacturable using other materials may be made with liquid crystal polymer layers.

Advantageous retarder film materials often include many of the following properties:

[1] Accurate reproducibility and uniformity of retardation;
[2] Very accurate reproducibility and uniformity control of in-plane optic axis;
[3] The ability to generate an appropriate out-of-plane optic axis profile that is reproducible and uniform;
[4] Practicality of producing films with low retardance value (e.g., 25–200 nm);
[5] Low depolarization factor (e.g., haze);
[6] Durability under high luminance (and optionally with some ultraviolet resistance);
[7] Performance reliability during temperature swings;
[8] Low cosmetic defect specification (particularly in the LCD plane);
[9] Insensitivity of mounting process to optical performance; and
[10] Reliability of mounting process (delamination).

Which material is best may depend upon the intended application or requirements of the projection system.

Another alternative compensation scheme includes placing a compensator between the light source polarizer and the micro-lens array. Such a compensator would have its tilt angle and retardance scaled according to the power of the micro-lens array.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

What is claimed is:

1. A projection system comprising:
a plurality of light-producing portions, each of the light-producing portions operable to produce modulated light of certain color spectra;
a light-directing element operable to receive the modulated light spectra from the light-producing portions and to combine those modulated light spectra; and
a projection lens operable to project the combined modulated light spectra onto a display surface;
wherein at least one of the plurality of light-producing portions comprises:
a light source operable to produce light;
a first panel, operable to receive light from the light source and to modulate the received light; and
a first oblique anisotropic compensation element adjacent to the first panel, the first oblique anisotropic compensation element being operable with the projection lens to provide an azimuthally averaged, improved contrast image upon the display surface relative to an uncompensated image, wherein the improvement to the image on the display surface is relatively independent of the point of view of an observer.

2. A projection system according to claim 1 wherein the anisotropy of the first oblique compensation element is positive anisotropy.

3. A projection system according to claim 1 wherein the anisotropy of the first oblique compensation element is selected from the group consisting of: positive anisotropy, negative anisotropy, and biaxial anisotropy.

4. A projection system according to claim 1 and further comprising at least a second panel and at least a second oblique anisotropic compensation element adjacent to the second panel, wherein the first and second panels are operable to modulate first and second light spectra, respectively.

5. A projection system according to claim 4 wherein one of the first and second oblique anisotropic compensation elements has positive anisotropy, and the other of the first and second oblique anisotropic compensation elements has negative anisotropy.

6. A projection system according to claim 5 wherein one of the first and second light spectra is blue and the other is red or green, and wherein the oblique anisotropic compensation element having the positive anisotropy is used to change a state of polarization of off-normal incident light in the first light spectrum and wherein the oblique anisotropic compensation element having the negative anisotropy is used to change a state of polarization of off-normal incident light in the second light spectrum.

7. A projection system according to claim 4, wherein at least one of the first and second oblique anisotropic compensation elements are splayed relative to their respective adjacent panels.

8. A projection system according to claim 7, wherein both of the first and second oblique anisotropic compensation elements are splayed and wherein their splays are symmetric to each other.

9. A projection system according to claim 7, wherein both of the first and second oblique anisotropic compensation elements are splayed and wherein their splays are asymmetric to each other.

10. A projection system according to claim 7, wherein both of the first and second oblique anisotropic compensation elements have the same anisotropy.

11. A projection system according to claim 7, wherein both of the first and second oblique anisotropic compensation elements have different anisotropies.

12. A projection system according to claim 7, wherein at least one of the first and second oblique anisotropic compensation elements has biaxial anisotropy.

13. A projection system according to claim 1, further comprising at least one micro-lens array adjacent to the first panel.

14. A projection system according to claim 1, wherein the light-directing element is an X-cube.

15. A projection system according to claim 1, wherein the first oblique anisatropic compensation element is substantially optimized for maximum azimuth-averaged contrast.

16. A projection system according to claim 1, wherein the first panel is a liquid crystal panel.

17. A projection system according to claim 1, wherein the oblique anisotropic compensation element includes a polymeric liquid crystal material.

18. A projection system according to claim 1, wherein the oblique anisotropic compensation element is a multilayer compensation element.

19. A projection system according to claim 1 and further comprising a second oblique anisotropic compensation element adjacent to the first panel.

20. A projection system according to claim 19, wherein the first and second oblique anisotropic compensation elements are on the same side of the first panel.

21. A projection system according to claim 19, wherein the first and second oblique anisotropic compensation elements are on the opposite sides of the first panel.

22. A projection system according to claim 13, wherein the first oblique anisotropic compensation element is on the low f-number side of the at least one micro-lens array.

23. A projection system according to claim 1, wherein the first panel and the first oblique anisotropic compensation element are formed on a common substrate.

24. A projection system according to claim 23, wherein the first panel is the substrate on which the first oblique anisotropic compensation element is formed.

25. A projection system according to claim 1, wherein the first oblique anisotropic compensation element has a tilt angle that ranges from about 0° to about 50°.

26. A projection system according to claim 1, wherein the first oblique anisotropic compensation element is splayed relative to the first panel.

27. A projection system comprising:
a plurality or light-producing portions, each of the light-producing portions operable to produce modulated light of certain color spectra;
a light-directing element operable to receive the modulated light spectra from the light-producing portions and to combine those modulated light spectra; and
a projection lens operable to project the combined modulated light spectra onto a display surface;

wherein at least one of the plurality of light-producing portions comprises:
a light source operable to produce light;
a first panel, operable to receive light from the light source and to modulate the received light; and
a first oblique anisotropic compensation element adjacent to the first panel, first oblique anisotropic compensation element being operable with the projection lens to provide an azimuthally averaged, improved constrast image upon the display surface relative to an uncompensated image, wherein the improvement to the image on the display surface is relatively independent of the point of view of an observer, and wherein the first oblique anisotropic compensation element is configured to change a state of polarization of off-normal incident light, and wherein the anisotropy of the first oblique compensation element is positive anisotropy.

28. A projection system according to claim 27 wherein the anisotropy of the first oblique compensation element is selected from the group consisting of: positive anisotropy, negative anisotropy, and biaxial anisotropy.

29. A projection system according to claim 27 and further comprising at least a second panel and at least a second oblique anisotropic compensation element adjacent to the second panel, wherein the first and second panels are operable to modulate first and second light spectra, respectively.

30. A projection system according to claim 29 wherein one of the first and second oblique anisotropic compensation elements has positive anisotropy, and the other of the first and second oblique anisotropic compensation elements has negative anisotropy.

31. A projection system according to claim 30 wherein one of the first and second light spectra is blue and the other is red or green, and wherein the oblique anisotropic compensation element having the positive anisotropy is used to change a state of polarization of offnormal incident light in the first light spectrum and wherein the oblique anisotropic compensation element having the negative anisotropy is used to change a state of polarization of oft-normal incident light in the second light spectrum.

32. A projection system according to claim 29, wherein at least one of the first and second oblique anisotropic compensation elements are splayed relative to their respective adjacent panels.

33. A projection system according to claim 32, wherein both of the first and second oblique anisotropic compensation elements are splayed and wherein their splays are symmetric to each other.

34. A projection system according to claim 32, wherein both of the first and second oblique anisotropic compensation elements are splayed and wherein their splays are asymmetric to each other.

35. A projection system according to claim 32, wherein both of the first and second oblique anisotropic compensation elements have the same anisotropy.

36. A projection system according to claim 32, wherein both of the first and second oblique anisotropic compensation elements have different anisotropies.

37. A projection system according to claim 32, wherein at least one of the first and second oblique anisotropic compensation elements has biaxial anisotropy.

38. A projection system according to claim 27, further comprising at least one micro-lens array adjacent to the first panel.

39. A projection system according to claim 27, wherein the light-directing element is an X-cube.

40. A projection system according to claim 27, wherein the first oblique anisotropic compensation element is substantially optimized for maximum azimuth-averaged contrast.

41. A projection system according to claim 27, wherein the first panel is a liquid crystal panel.

42. A projection system according to claim 27, wherein the oblique anisotropic compensation element includes a polymeric liquid crystal material.

43. A projection system according to claim 27, wherein the oblique anisotropic compensation element is a multilayer compensation element.

44. A projection system according to claim 27 and further comprising a second oblique anisotropic compensation clement adjacent to the first panel.

45. A projection system according to claim 44, wherein the first and second oblique anisotropic compensation elements are on the same side of the first panel.

46. A projection system according to claim 44, wherein the first and second oblique anisotropic compensation elements are on the opposite sides of the first panel.

47. A projection system according to claim 38, wherein the first oblique anisotropic compensation element is on the low f-number side of the at least one micro-lens array.

48. A projection system according to claim 27, wherein the first panel and the first oblique anisotropic compensation element are formed on a common substrate.

49. A projection system according to claim 48, wherein the first panel is the substrate on which the first oblique anisotropic compensation element is formed.

50. A projection system according to claim 27, wherein the first oblique anisotropic compensation element has a tilt angle that ranges from about 0° to about 50°.

51. A projection system according to claim 27, wherein the first oblique anisotropic compensation element is splayed relative to the first panel.

* * * * *